March 18, 1958

B. O. WILCOX 2,827,370

PROCESS AND APPARATUS FOR TREATING ZINC
ORES AND ORE CONCENTRATES

Filed July 3, 1951

INVENTOR.
Barnard O. Wilcox
BY
Fred Wells
Atty.

March 18, 1958  B. O. WILCOX  2,827,370
PROCESS AND APPARATUS FOR TREATING ZINC
ORES AND ORE CONCENTRATES
Filed July 3, 1951  2 Sheets-Sheet 2

INVENTOR.
Barnard O. Wilcox
BY

Atty.

2,827,370

PROCESS AND APPARATUS FOR TREATING ZINC ORES AND ORE CONCENTRATES

Barnard O. Wilcox, Wallace, Idaho

Application July 3, 1951, Serial No. 234,924

4 Claims. (Cl. 75—9)

My invention relates to improvements in process and apparatus for treating zinc ores and ore concentrates.

It is common practice in many mining areas to crush and grind sulfide ores and then to collect the mineral values by flotation processes into what is termed concentrate. My invention has to do with the further treatments of these concentrates, particularly zinc concentrate, to remove the iron and silica and other insoluble materials.

It is the principal purpose of my invention to provide an improved method of heating the concentrates to remove sulfur, iron and silica in a single operation leaving the mineral values in a condition for further and easier separation and purification.

It is also a purpose of my invention to provide an improved furnace construction for roasting the concentrates wherein the concentrates are dropped into a tunnel which is preheated to a sufficient temperature to ignite and burn the sulfides, the materials being carried along the tunnel by a blast of air or oxygen with a suitable fuel in sufficient quantities to maintain a desired temperature in the tunnel, the furnace having an enlarged chamber into which the tunnel discharges and where the volatilized materials are carried off and the slag is caused to flow to a slag outlet in a thin sheet or stream so that the volatilized material may boil out of the slag.

The nature and advantages of my invention will appear more fully from the following description and the accompanying drawings illustrating a preferred embodiment of the invention. It is to be understood, however, that the drawings and description are illustrative only and are not intended to limit the invention except insofar as it is limited by the claims.

A typical ore concentrate to which my invention applies is a sphalerite ore concentrate which ordinarily will have about 50 percent zinc, 2 percent lead, 5 percent iron, 5 percent silica and small amounts of silver and cadmium, the balance of the weight of the material being sulfur. Generally the sulfur is removed by roasting, but roasting of the concentrate to drive off the sulfur leaves the iron and silica with the metal which is to be recovered. The roasting of the concentrate in an oxidizing atmosphere converts the sulfur into sulfur dioxide which is readily separated from any mineral values that may go with the sulfur by cooling the vapors from the roasting and depositing the mineral values in a bag house. Heretofore it has been extremely difficult to separate the iron and silica from the zinc. Usually a leaching and electrolytic deposition process is necessary.

According to my invention I am able to improve the metal recovery and at the same time eliminate from the recovered metals most of the iron and silica so that the total remaining percentage of these deleterious products will be less than one-tenth of that now remaining in the processes currently used.

Figure 1:
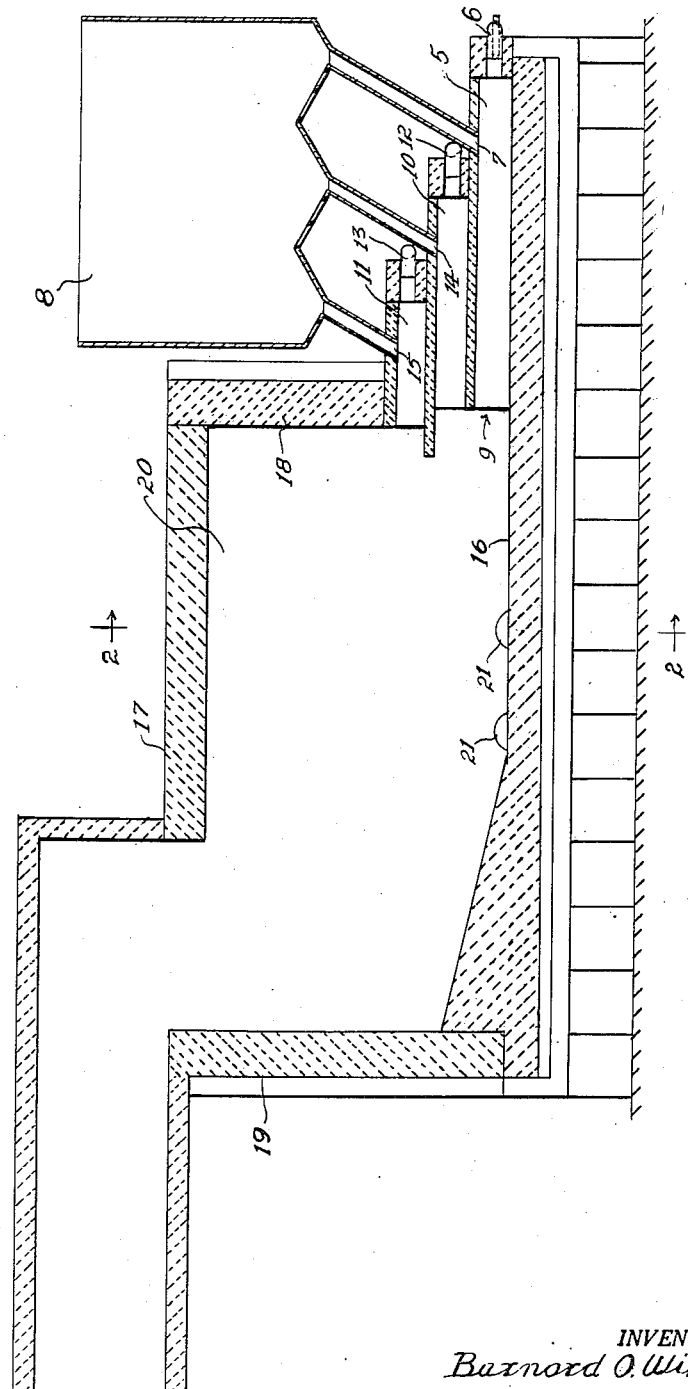
Figure 1 is a somewhat diagrammatic view in section of a furnace in which my invention is practiced.
Figure 2:
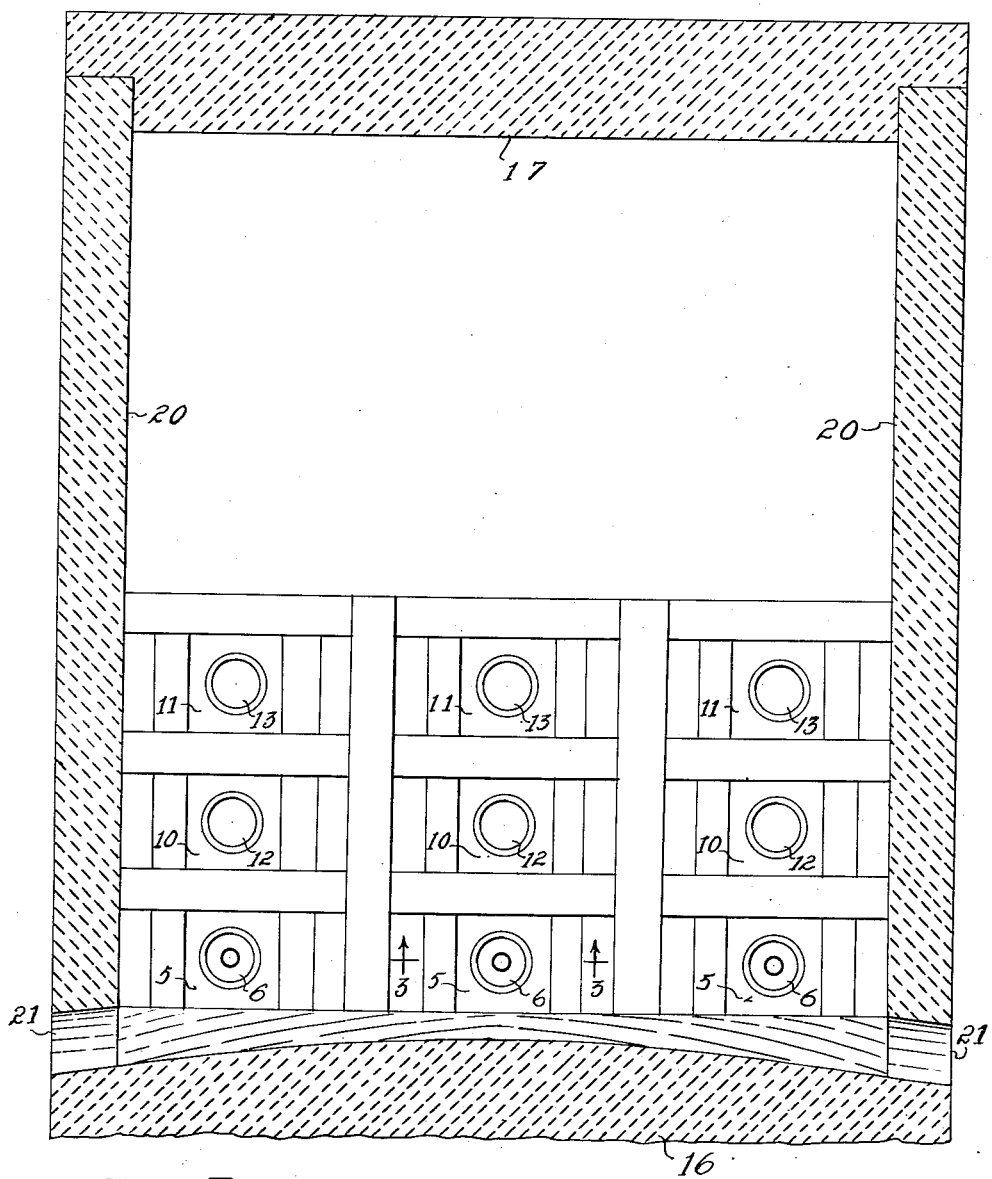
Figure 2 is a sectional view taken transversely through the furnace on the line 2—2 of Figure 1.
Figure 3:
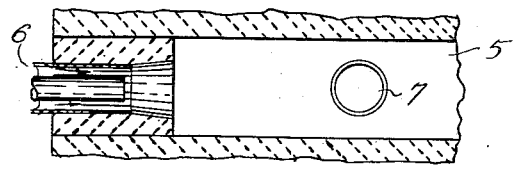
Figure 3 is a fragmentary sectional view taken on the line 3—3 of Figure 2.

According to my invention I provide a furnace as illustrated in Figure 1 with long narrow ignition and flash burning tunnels 5. An air and fuel inlet nozzle is provided in each tunnel 5 at 6 for directing a blast of oxidizing gas, such as air or oxygen, lengthwise through the tunnel 5. Initially the tunnel must be preheated by using sufficient fuel with the gas. When the tunnel is brought up to an operating temperature of about 2700 degrees F., the ore is dropped from a hopper 8 into the tunnel through an inlet opening 7 in the top of the tunnel at some distance away from the inlet nozzle. At the point where the ore enters the tunnel the blast of hot gas and fuel strikes the ore concentrate while it is falling and ignites it. Since the tunnel temperature is far above the ignition temperature (up to 1700 degrees F.) for the ore particles and an excess of oxygen is present, the particles are ignited in the very short drop provided in the tunnel. The ignited particles are carried lengthwise through the tunnel by the blast of gas, the smaller particles burn in suspension and the larger particles fall to the hearth in the tunnel and are gradually burned as they approach the tunnel outlet to the main part of the furnace chamber indicated at 9. The excess of air in the blast also converts most of the zinc to zinc oxide in the tunnel.

The concentrates are usually quite fine, 100 percent of the concentrate in a typical batch will pass a 50 mesh screen, 80 percent will pass a 200 mesh screen, and 30 percent of the concentrate is so fine that it will pass a 300 mesh screen. It will be appreciated that a material so fine presents a dust problem in that the particles will be readily carried in suspension. The tunnel 5 is long enough however, to insure substantially complete burning of all particles and conversion of most of the zinc to the oxide by the time the larger chamber of the furnace is reached.

There will be some piling up of the larger burning particles on the hearth in the tunnel but as they burn they lose zinc and start to melt as they are swept along to the tunnel outlet. Initially the minerals combined in the particles prevent the larger ones from melting readily and flowing so that some of them are carried as discrete particles with the molten mass to the tunnel outlet. A high percentage of iron also will tend to cause the slag melting temperature to be higher. In some instances I find it necessary to add silica in some form such as sand, so as to decrease the proportion of iron in the slag and thus obtain a proper slagging temperature.

When the main furnace chamber 9 is reached by the material the volatilized material and the gases of combustion will rise and flow out of the stack of the furnace. The temperature in the main furnace chamber is somewhat less than the temperature in the tunnel due to heat losses and the termination of the principal burning. A furnace temperature of 2300 degrees or 2400 degrees F. at the middle of the furnace is customarily found when the tunnel temperatures are maintained at about 2700 degrees F. The temperature at which the slag will melt is so reduced by the burning out of the sulfides and formation of zinc oxide in the tunnel that by the time the nonvolatile materials are discharged from the tunnel the temperature in the main part of the furnace is sufficiently high to maintain the slag in a molten condition. The slag will therefore flow along the main chamber floor toward the slag outlet in a relatively thin stream or sheet so that the fuming or boiling out of the remaining zinc will continue to take place along the furnace floor after the material leaves the tunnel and slowly drops in temperature. The furnace floor is inclined sufficiently with respect to the horizontal to enable the slag to flow. The depth of the slag stream can be maintained at any desired level, preferably about an inch or less so that the boiling out of the zinc and other metals from the slag has ample opportunity to take place. I find, for example, that a considerable amount of the zinc is boiled out of the slag after the material leaves the tunnel. A slag sample taken at the outlet of the tunnel may show as much as 10 percent zinc content when another sample taken at the slag outlet will show 1 percent or less of zinc remaining.

The heat efficiency of the furnace is enhanced by using multiple tunnel inlets as shown, so that a second tunnel 10 is directly over the tunnel 5 and a third tunnel 11 is directly over the tunnel 10. The roof of the tunnel 5 forms the hearth of the tunnel 10 and the roof of the tunnel 11 forms the hearth of the tunnel 11. The tunnels 10 and 11 are equipped with air blast inlets 12 and 13 respectively and the tunnels 10 and 11 are also equipped with concentrate inlets 14 and 15 respectively from the hopper 8. It will be appreciated that in operation much of the heat from the tunnel 5 will be communicated to the hearth of the tunnel 11. The tunnels are arranged as shown, so that the ore inlet of the tunnel 10 is directly over the hotter part of the tunnel 5 and the ore inlet of the tunnel 11 is directly over the hotter part of the tunnel 10. Once the furnace is in operation practically no additional fuel is required to maintain the required temperature in tunnels 10 and 11. The burning of the sulfides in the tunnels 10 and 11 adds to the heat in these tunnels obtained from the tunnels below. The slag from each of the tunnels 10 and 11 falls to the floor of the furnace beyond the outlet of the tunnel below it.

In constructing the furnace any good refractory material can be used for the main part of the furnace including the floor 16, the arch 17, the front and rear walls 18 and 19 and the sides 20. The tunnel sides and top however, are subjected to extreme temperature conditions and should be constructed of a very good refractory material capable of withstanding the higher temperatures and heavy wear in the tunnels. In practice the tunnels are subjected to the greatest abuse and wear but owing to the drop in temperature in the main chamber 9, the walls of this chamber stand up very well. The principal replacement necessary in operation is therefore in the tunnels.

The floor 16 of the furnace is highest at the front so that the slag will flow toward the rear wall 19. It is also highest along the longitudinal center line to direct the slag to the sides of the furnace where it can escape through slag holes 21 in the side walls 20 of the furnace.

The present invention takes advantage of the characteristics of zinc and like ores to effect a separation which ignites the particles in a blast where they are substantially in suspense. At this point the temperature in the tunnel is at a maximum. After the blast or suspension burning takes place the metal content of the ore is so reduced that it can be melted more readily and the remaining zinc, iron, silica and gangue will flow as a slag. According to my invention this flowing slag is spread out over the furnace floor in a thin layer (usually not more than an inch thick). The boiling of the slag to remove the remainder of zinc to be recovered takes place while the slag is flowing on the furnace floor.

Heretofore the slag fuming process has not been considered applicable to raw ores and concentrates because of the fact that with the sphalerite in the unburned state, the temperature at which a molten slag will be reached is much too high for practical operation. With my invention the specific high temperatures for burning of the ore and formation of the metal oxides, are created in the ore particles while they are kept in rapid motion or suspension in the tunnels with an excess of air or oxygen. The ignition of the particles themselves must be initially obtained by heat in the tunnels, either from fuel or radiation from the walls of the tunnel and preheated air. The actual burning temperature reached in the particles, however, is the sum of the temperatures at which they ignite, plus the added temperatures due to their burning. Once the oxidation of most of the zinc has taken place, the remaining solids will remain molten at a lower temperature so that the furnace chamber 9 in which the final zinc removal is carried on, can be held at a temperature much lower than the temperature necessary for flash igniting the sulfides in the tunnel.

In its basic concept the present system is one of removing iron and silica and inert gangue from the zinc concentrates. The other mineral values which are usually found in zinc ores, namely lead, silver and cadmium are oxidized with the zinc and pass out of the furnace. In some instances where the iron content of the ore is fairly high, it is necessary to dilute the ore with a source of silica because a high iron content in the slag will also require a higher temperature to melt the slag. Any suitable source of silica may be used such, for example, as mill tailings.

It is believed that the nature and advantages of my invention will be clear from the foregoing description. While the invention has been described specifically in connection with a particular furnace construction, it is evident that the construction details of the furnace may be greatly varied within the scope of the invention as set forth in the following claims.

Having thus described my invention, I claim:

1. A method of separating silica, iron and gangue from fine particles of sphalerite ores and concentrates thereof, said method comprising the heating and blowing of an oxidizing gas through a narrow elongated passageway at a temperature sufficient to maintain the passage at a temperature far above the ignition temperature of the zinc sulfides in said ore particles, dropping a stream of the ore particles into the passage near the entrance point of the oxidizing gas, thereby igniting and burning zinc sulfide in the particles while the particles are falling and in motion along the passage, melting the unburned solids of the ore and flowing them from the passage into an enlarged chamber and boiling the molten solids at a reduced temperature in the enlarged chamber.

2. A method of separating silica, iron and gangue from fine particles of sphalerite ores and concentrates thereof, said method comprising the heating and blowing of an oxidizing gas through a narrow elongated passageway at a temperature sufficient to maintain the passage at a temperature of approximately 2700 degrees F., dropping the ore particles into the stream of heated oxidizing gas within the passageway, thereby igniting the particles while they are suspended by the gas, burning out the zinc sulfide of the particles and melting the remaining solids in said passageway, utilizing an excess of the oxidizing gas to blow the molten solids and products of combustion from said passageway into an enlarged chamber and there boiling the molten solids at a temperature of approximately 2400 degrees F.

3. The method of treating zinc sulfide ore to remove iron and silica therefrom, which comprises igniting and burning finely divided particles of the ore in a fast moving stream of oxidizing gas, maintained at a temperature at least 400 degrees F. above the ignition temperature of the zinc sulfide, thereby converting the major portion of the zinc sulfides in the ore particles to oxides in the gaseous state and melting the remaining solids, then dropping the temperature of the gaseous products and the molten solids about 300 degrees F. and boiling the solids in the presence of the oxidizing gas at the lowered temperature.

4. A treating furnace adapted to separate iron and silica from the zinc in sphalerite ores and concentrates thereof, said furnace comprising a plurality of horizontal blast tunnels arranged in a vertical row with the roofs of the lower tunnels serving as the hearths of the superposed tunnels, means for supplying a stream of preheated oxidizing gas through each tunnel, means to drop ore particles into each tunnel and an enlarged furnace chamber into which the several tunnels lead.

References Cited in the file of this patent

UNITED STATES PATENTS

| | | |
|---|---|---|
| 1,315,460 | Blackwell et al. | Sept. 9, 1919 |
| 1,366,626 | Alexander | Jan. 25, 1921 |
| 1,524,182 | Kjolberg | Jan. 27, 1925 |
| 1,555,538 | White | Sept. 29, 1925 |
| 2,530,078 | Ramsing | Nov. 14, 1950 |